INVENTOR.
EMANUEL M. AMIR,
BY
ATTORNEY

United States Patent Office 3,379,787
Patented Apr. 23, 1968

3,379,787
SYNTHESIS OF 5-t-BUTYL-m-XYLENE
Emanuel M. Amir, Baytown, Tex., assignor to Esso Research and Engineering Company
Filed Sept. 16, 1965, Ser. No. 487,811
9 Claims. (Cl. 260—671)

ABSTRACT OF THE DISCLOSURE

By alkylating a $C_8$ aromatic hydrocarbon fraction substantially free of ethylbenzene and containing m-xylene with diisobutene or triisobutene at 60° to 100° C. in the presence of anhydrous aluminum chloride, 5-t-butyl-m-xylene is selectively produced.

---

The present invention is directed to an improved method for producing 5-t-butyl-m-xylene.

The present invention may be briefly described as a method for producing 5-t-butyl-m-xylene which comprises alkylating a $C_8$ fraction substantially free of ethylbenzene with an alkylating agent selected from diisobutene or triisobutene at a reaction temperature between 60° and 100° C. with a catalytic amount of anhydrous aluminum chloride in liquid phase.

The present invention is based on the finding that the use of the dimer and trimer of isobutene at temperatures considerably in excess of the usual temperatures used in a Friedel-Crafts alkylation process results in increased selectivity and a higher purity of 5-t-butyl-m-xylene. In the usual Friedel-Crafts alkylation process, reaction temperatures are maintained as low as possible to prevent the production of a large amount of undesirable byproducts. These byproducts may be a result either of polymerization or the formation of undesired materials produced as a result of the higher temperature. While the prior art would indicate that homogeneous liquid phase reactions should be carried out at or near room temperature (30° C.) it was found according to the present invention, that selectivity was increased at temperatures between 60° to 100° C.

It was further found according to the present invention that anhydrous aluminum chloride as a catalyst produced the greatest selectivity and provided a technically feasible and economical process.

According to the present invention, an aromatic $C_8$ fraction, which is substantially free of ethylbenzene is alkylated with diisobutene or triisobutene to produce 5-t-butyl-m-xylene. The ethylbenzene concentration in the feed of the present invention must be less than 5 mol percent. Accordingly, suitable fractions for the present invention are an isomeric xylene concentrate; a mixture of meta- and paraxylene substantially free of both orthoxylene and ethylbenzene; or a substantially pure feed of metaxylene.

According to the present invention the alkylating agent is the dimer or trimer of isobutene. The dimer or trimer of isobutene may be used individually or in admixture. Also suitable as the alkylating agent would be the product stream from a dimerization process where isobutene is dimerized.

The alkylation conditions for the present invention are at reaction temperatures of between 60° and 100° C. A preferred range is 75° to 85° C. It was found that 80° C. was an optimum temperature as will be shown more fully hereinafter.

The catalyst used in the present invention is anhydrous aluminum chloride which is added in a catalytic amount of 0.1 to 10 weight percent. Preferably 0.5 to 2% by weight may be used. It was found that an effective amount of anhydrous aluminum chloride was at a level of about 1% by weight.

The present invention will be further illustrated by reference to the drawing in which.

Figure 1:
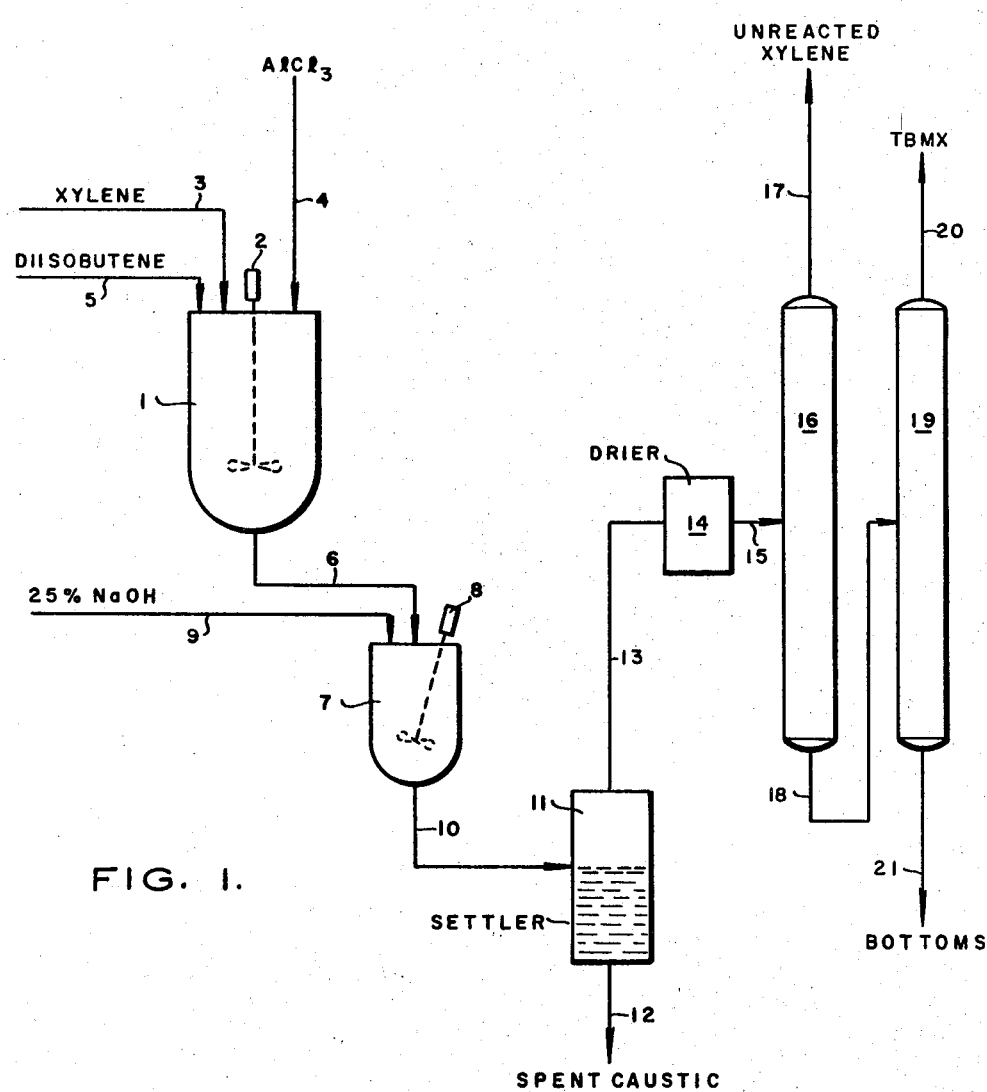
FIG. 1 is a schematic diagram of a preferred mode of the synthesis of 5-t-butyl-m-xylene.

Referring to FIG. 1, the reaction is carried out in liquid phase in a reaction vessel 1. The reaction vessel 1 has a stirrer 2. An aromatic $C_8$ fraction is introduced by line 3 which may be substantially pure metaxylene. The catalyst, anhydrous aluminum chloride, is added by line 4. To the mixture is added the alkylating agent, diisobutene, by line 5. The reactor is maintained at a temperature of about 75° to 85° C., preferably 80° C. The reaction may be carried out as a batch process or as a continuous process. The reaction mixture is removed by line 6 from reaction vessel 1 and is introduced by line 6 into a caustic wash vessel 7. The caustic wash vessel has a stirrer 8. To the vessel 7 is added caustic by line 9, wherein the reaction mixture and the caustic, 25% sodium hydroxide, is mixed at a temperature of between 100° to 110° C. The mixture is removed from the caustic wash vessel by line 10 to a settler 11. The settler is maintained at a temperature greater than 70°. Spent caustic is removed by line 12. The washed reaction mixture is removed by line 13, passed through a dryer 14, and introduced by line 15 to a column 16. The column 16 is a distillation column to separate the unreacted xylenes which are removed by line 17. The alkylated product is removed from the bottom of column 16 by line 18 and introduced into a distillation column 19 wherein the pure 5-t-butyl-m-xylene (TBMX) is removed by line 20 from the heavier boiling products which are removed by line 21.

The present invention will be further illustrated by the following specific examples which are given by way of illustration and not as limitations on the scope of the invention.

Example 1

Into a batch reactor was added 530 g. (5.0 mols) m-xylene and 6 g. of anhydrous aluminum chloride. The mixture was heated to 80° C., and to the heated mixture was added diisobutene at the rate of 33% equivalence of diisobutene per hour. Over the period of three hours 272.5 g. (2.433 mols) of diisobutene was added. The alkylated product was analyzed and found to be the following:

| Products: | Wt. percent |
|---|---|
| 5-t-butyl-m-xylene | 76.83 |
| m-Xylene | 13.14 |
| Heavy material | 8.67 |
| Nonaromatic | 0.87 |
| p-Xylene | 0.44 |
| Unknown | 0.05 |

The conversion based on the diisobutene was 97.4 mol percent. Conversion was 80.1 mol percent based on m-xylene. The selectivity to 5-t-butyl-m-xylene was 80.2 mol percent based on diisobutene; 95.0 mol percent based on m-xylene; and 76.2 mol percent overall selectivity.

From the foregoing example the alkylation of m-xylene with diisobutene is accomplished at both high selectivity and conversion.

Example 2

Similarly as in Example 1, using substantially pure m-xylene, runs using isobutene, diisobutene, and triisobutene as the alkylating agent are compared. Also for comparative purposes is an alkylation with isobutene as the alkylating agent in a fixed bed process. The comparison of the various runs is set forth in Table I below:

TABLE I

|  | Liquid Isobutene, Homogeneous | Liquid Diisobutene, Homogeneous | Liquid Triisobutene, Homogeneous | Fixed Bed Isobutene |
|---|---|---|---|---|
| Catalyst | (1) | (1) | (1) | (2) |
| Eq. iC$_4$=/m-xylene | 1.00 | 0.973 | 0.957 | 1.13 |
| Temperature (° C.) | 30 | 80 | 80 | 210 |
| Pressure (p.s.i.g.) | 0 | 0 | 0 | 150 |
| Conversion, mol percent: |  |  |  |  |
| Olefin | 96.0 | 97.4 | 95.2 | 85 |
| m-Xylene | 59.0 | 80.1 | 76.0 | 33 |
| Selectivity to 5-t-Butyl-m-xylene, mol percent: |  |  |  |  |
| Olefin | 52.8 | 80.2 | 83.1 | 25 |
| m-Xylene | 68.3 | 95.0 | 99.6 | 84 |

1 AlCl$_3$.
2 ZnCl$_2$/Al$_2$O$_3$.

As can be seen by the comparison of the processes using diisobutene and triisobutene as the alkylating agent, at comparable conversions they give substantially increased selectivity to the 5-t-butyl-m-xylene. Thus, it can be seen that, using the dimer and trimer of isobutene as the alkylating agent and a higher temperature, a much superior product is produced.

Example 3

The alkylation of a preferred feed material and in a continuous process is shown in tabular form in Table II below:

TABLE II.—ALKYLATION OF m-XYLENE CONCENTRATE

Aromatic feed: Mol percent
Ethylbenzene _____ 1.21
p-Xylene _____ 11.53
m-Xylene _____ 86.86
o-Xylene _____ 0.40

100.00

Alkylation conditions:
Temperature _____ 80° C.
Feed composition __ 0.45.1 Diisobutene/m-Xylene, mol ratio.
Feed rate _____ 0.6 LHSV.
Catalyst _____ AlCl$_3$ 1% on total aromatics.

Conversion mol percent:
Diisobutene _____ 95.4.
m-Xylene _____ 66.3.

Selectivity to 5-t-butyl-m-xylene:
Diisobutene _____ 75.0
m-Xylene _____ 97.8

Comparing the results of this Example 3 with that of Example 1, for example, using pure m-xylene indicates that the conversion of m-xylene is lower with the preferred feed here, but the selectivity is much higher. This is attributed to the isomerization of some p-xylene to m-xylene during the reaction which would give an apparent lower conversion and subsequently a higher calculated selectivity.

The purity of the 5-t-butyl-m-xylene which can be produced from this preferred feed can be judged from the analysis of the total undistilled C$_{12}$ alkylate fraction as obtained by GC (gas chromatographic) analysis of the total reaction products. These values are given in Table III below:

TABLE III.—C$_{12}$ ALKYLATE FRACTION IN TOTAL PRODUCT

Mol percent
5-t-butyl-m-xylene _____ 98.22
4-sec-butyl-m-xylene _____ 0.74
4-t-butyl-o-xylene _____ 0.66
sec-butyl-p-xylene _____ 0.14
4-t-butylethylbenzene _____ 0.12
3-t-butylethylbenzene _____ 0.06
5-sec-butyl-m-xylene _____ 0.06

Figure 2:
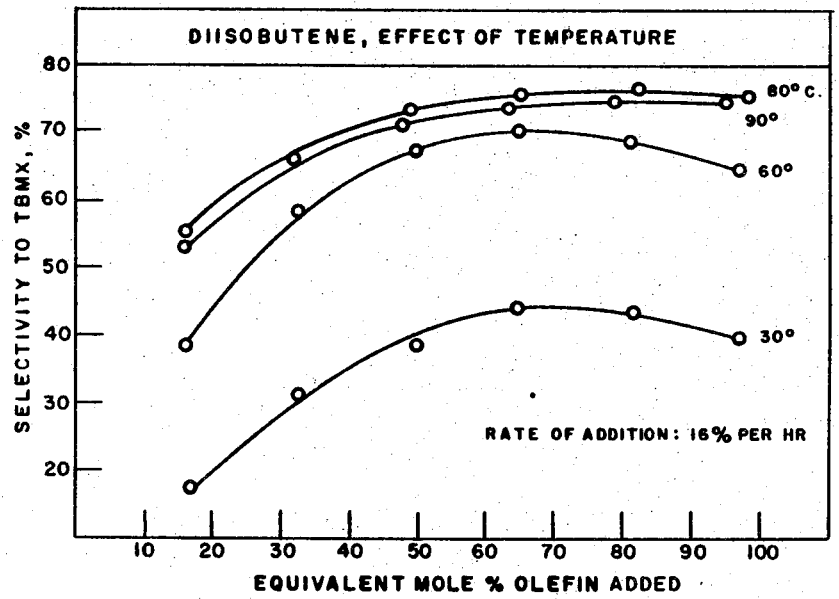
FIG. 2 is a diagram illustrating the effect of temperature on the synthesis.

Referring to FIG. 2 in the drawing, the effect of temperature on the synthesis of 5-t-butyl-m-xylene is shown.

The data in FIG. 2 was obtained by batch process using diisobutene as the alkylating agent, the addition being between 20 and 100 equivalent mol percent as shown in FIG. 2. The increase in selectivity from 30° C. to 80° C. is marked. It is to be noted that at 90° C. the selectivity decreases from that at 80° C.

Figure 3:
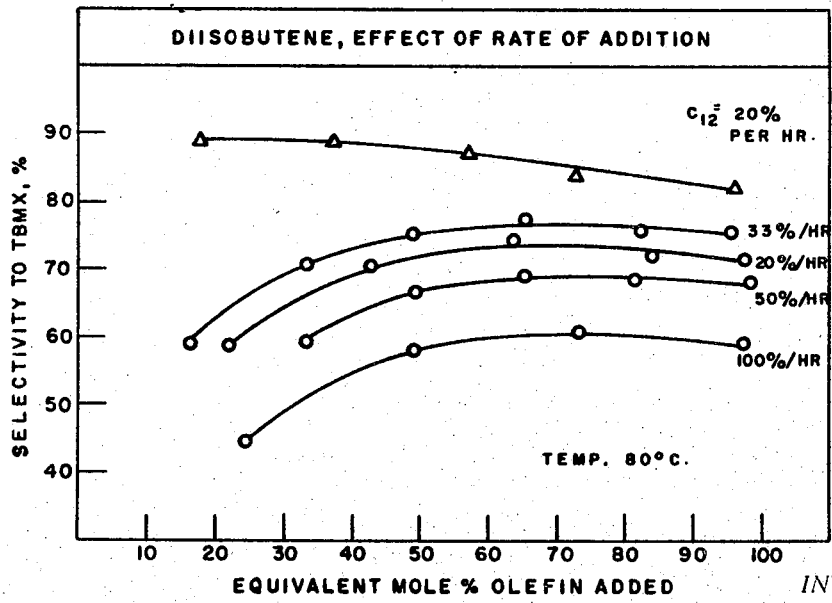
FIG. 3 is a diagram illustrating the effect of rate of addition to a batch process on the synthesis.

Referring to FIG. 3 of the drawing, the effect of rate of addition of the diisobutene is shown. Again, the data is with a batch process and shows that the rate of addition of the alkylating agent should be maintained between 25 and 40% per hour to obtain maximum selectivity. In a continuous process data indicates that a flow rate of 0.3 to 0.8 LHSV (liquid hourly space velocity) and preferably between 0.5 to 0.67 LHSV of total feed is necessary to maintain maximum selectivity at a diisobutene to m-xylene molar ratio of 0.35 to 0.55 and preferably 0.4 to 0.5. Also shown in FIG. 3 is data wherein triisobutene is used as the alkylating agent showing its maximum effectiveness toward selectivity. With triisobutene at similar flow rates of 0.3 to 0.8 LHSV the molar ratio of triisobutene-m-xylene would be 0.23 to 0.36 and preferably 0.27 to 0.33.

The nature and object of the present invention having been completely described and illustrated and the best mode thereof contemplated set forth, what I wish to claim as new and useful and secure by Letters Patent is:

1. A method for selectively producing 5-t-butyl-m-xylene which comprises alkylating a C$_8$ aromatic hydrocarbon fraction containing m-xylene and substantially free of ethylbenzene with an alkylating agent selected from the group consisting of diisobutene and triisobutene at a reaction temperature of 60° to 100° C. with a catalytic amount of anhydrous aluminum chloride admixed with said reactants.

2. A method for selectively producing 5-t-butyl-m-xylene which comprises alkylating a m-xylene concentrate containing less than 5 mol percent ethylbenzene with an alkylating agent selected from the group consisting of diisobutene and triisobutene at a reaction temperature of 75° to 85° C. with a catalytic amount of anhydrous aluminum chloride admixed with said reactants.

3. A method according to claim 2 wherein said alkylating agent is diisobutene.

4. A method according to claim 2 wherein said alkylating agent is triisobutene.

5. A method according to claim 2 wherein said reaction temperature is about 80° C.

6. A method according to claim 2 wherein the amount of anhydrous aluminum chloride is about 1 percent by weight.

7. A batch method for selectively producing 5-t-butyl-m-xylene which comprises adding a catalytic amount of anhydrous aluminum chloride to a C$_8$ fraction which contains m-xylene and less than 5 mol percent ethylbenzene, heating the mixture to a temperature between 75° and 85° C. and adding an alkylating agent selected from the group consisting of diisobutene and triisobutene, said aluminum chloride being admixed with said reactants.

8. A method according to claim 6 wherein the addition of the alkylating agent is between 20 and 100 equivalent mol percent.

9. A continuous method for selectively producing 5-t-butyl-m-xylene which comprises mixing a m-xylene concentrate fraction with an alkylating agent selected from the group consisting of diisobutene and triisobutene and with a catalytic amount of anhydrous aluminum chloride at a reaction temperature of 75° to 85° C.

References Cited

UNITED STATES PATENTS

| 2,187,034 | 1/1940 | Ipatieff et al. | 260—671 |
| 2,385,303 | 9/1945 | Schmerling | 260—671 |
| 2,395,775 | 2/1946 | Anderson et al. | 260—671 |

DELBERT E. GANTZ, *Primary Examiner.*

C. R. DAVIS, *Assistant Examiner.*